United States Patent [19]

Schröder et al.

[11] Patent Number: 5,020,783
[45] Date of Patent: Jun. 4, 1991

[54] TORSIONAL SPRING

[75] Inventors: Bernd Schröder, Bietigheim; Rudolf Hartmann, Karlsbad-Auerbach; Helmut Thate, Neustadt, all of Fed. Rep. of Germany

[73] Assignee: IBP Pietzsch GmbH, Ettlingen, Fed. Rep. of Germany

[21] Appl. No.: 459,696
[22] PCT Filed: Jun. 2, 1989
[86] PCT No.: PCT/DE89/00364
    § 371 Date: Jan. 26, 1990
    § 102(e) Date: Jan. 26, 1990
[87] PCT Pub. No.: WO89/11993
    PCT Pub. Date: Dec. 14, 1989

[30] Foreign Application Priority Data

Jun. 4, 1988 [DE] Fed. Rep. of Germany ....... 3819162

[51] Int. Cl.⁵ .............................. F16F 1/48; F16F 1/14
[52] U.S. Cl. ..................................... 267/273; 267/149; 267/154
[58] Field of Search ............... 267/149, 154, 273, 276, 267/279, 280, 282, 285

[56] References Cited

U.S. PATENT DOCUMENTS 2,573,361 10/1951 Rodgers et al. ................. 267/154 X
2,942,871  6/1960 Kraus .................................... 267/57
4,473,238  9/1984 Aubry .............................. 267/149 X

FOREIGN PATENT DOCUMENTS 0097540 1/1984 European Pat. Off. .
1000643 6/1957 Fed. Rep. of Germany .
0892418 4/1944 France .................................... 267/273
0215135 9/1987 Japan ..................................... 267/154
1439586 6/1976 United Kingdom ................. 267/279

Primary Examiner—Robert J. Oberleitner
Assistant Examiner—Peter M. Poon
Attorney, Agent, or Firm—Max Fogiel

[57] ABSTRACT

A torsional spring to be secured non-rotating to mutually rotating components at each end. At least two thin-walled piping sections are positioned loosely coaxial and secured together non-rotating at one end, accordingly functioning as a series of resilient sections. There are means of securing them non-rotating to the mutually rotating components at the other end. The spring especially constitutes a torsion bar for a connecting rod that pivots in a bearing mounted stationary in a vehicle and positions either a running wheel or a caterpillar cogwheel at the end remote from the bearing. The piping sections are integrated into each other such that one merges directly into the other at the end where they are secured together non-rotating in a turnback that represents a transition point. The piping sections are preferably made of fiber-reinforced plastic and may have several layers.

17 Claims, 2 Drawing Sheets

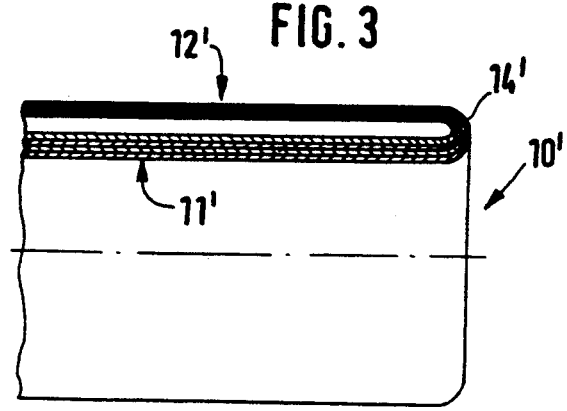
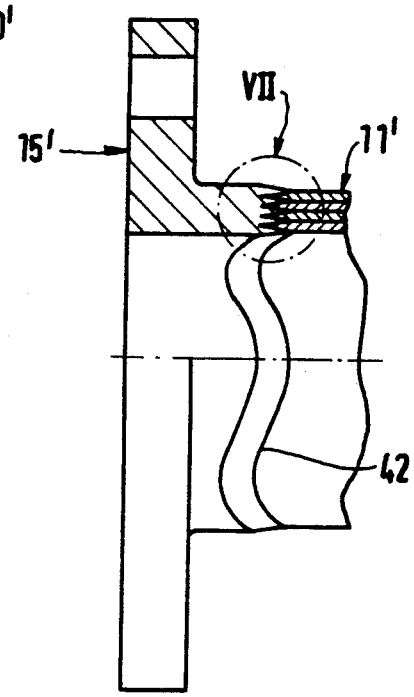
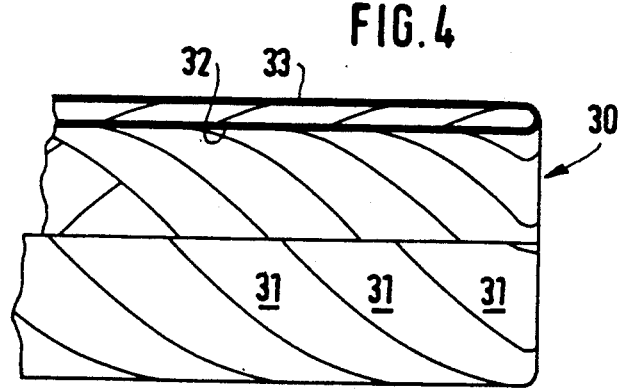
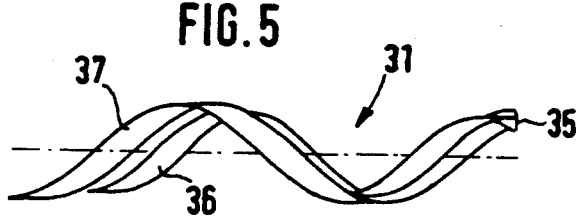
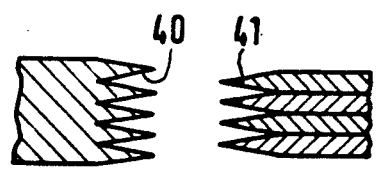

TORSIONAL SPRING

BACKGROUND OF THE INVENTION

The invention concerns a torsional spring with each end secured non-rotating to a component that does rotate in relation to the component at the other end and consisting of at least two coaxial thin-walled sections of piping, one of which accommodates the other concentrically and loosely, that are secured together non-rotating at one end and accordingly constitute a series of torsional resilient sections and that are provided at the other end with means of securing them non-rotating to the components that rotate in relation to each other. The invention in particular concerns a torsion bar for a connecting rod that pivots in a bearing mounted stationary in a vehicle and positions either a running wheel or a Caterpillar cogwheel at the end remote from the bearing.

A torsion bar of this type and for this purpose is known from German AS 1 010 332. One end of the two loosely concentric piping sections is rigidly secured to the same end of the other. The joints at the ends of this rod are considerably extensive axially and consist of rings welded in between the piping sections. This type of securing area necessarily leads either to reducing the lengths of section available for the actual spring or to increasing its overall length.

When torsional springs of this type are employed for suspending running wheels or Caterpillar cogwheels from connecting rods, the springs' overall length is particularly important in that they must be accommodated within the wheelbase.

SUMMARY OF THE INVENTION

The object of the present invention is accordingly to improve the torsional spring to the extent that it will provide a greater rotation at less weight than the known spring and will also be easier to manufacture and install.

This object is attained in accordance with the invention by integrating the piping sections in the torsional spring into each other such that one merges directly into the other at the end where they are secured together non-rotating in a turnback that represents a transition point.

In contrast to the known torsional spring, wherein the two loosely concentric piping sections are joined by a ring inserted at one end and welded to both sections, the two sections in the invention are in one piece and merge together smoothly at the point of transition. This design allows exploitation of the total length of the piping sections as a spring.

The two piping sections that constitute a series of resilient sections in one important embodiment are made of fiber-reinforced plastic. It will in this case be practical for the piping sections to be weak springs with fibers that extend at 45° to their longitudinal axis. The plastic can be reinforced with glass fibers in particular.

The advantages of fiber-reinforced composites, which are in themselves known, in comparison with steel are that they are lighter in weight and can accommodate more work. In spite of the low modulus of elasticity of such materials, a series of at least two loosely concentric sections made thereof will result in a comparatively long spring range. This is especially true when the embedded fibers are coiled at 45° to the longitudinal axis as in the previously mentioned advanced version of the embodiment now being discussed.

Although torsional springs made of fiber-reinforced composites are approximately 40% larger than those made of steel that accommodate the same level of work, their lower density and essentially lower shear modulus means that torsional springs made from a composite will weigh only about 15 1/3 as much as one made from steel. This situation more than compensates for the advantage of steel torsional springs in terms of maximum permissible shearing strain. Light-weight piping sections are also easy to manufacture from fiber-reinforced composites.

It turns out to be of advantage to ensure a smooth transition from one section of piping to the other in the torsional springs in accordance with the invention for the reinforcing fibers to extend through the transition from one piping section to the other. It can in this case be practical for the reinforcing fibers to coil through each piping section and for the mathematical sign representing the direction of their helical path to reverse in the vicinity of the transition from one section to the other.

Loosely concentric piping sections of course differ in diameter. In spite of this difference in diameter, on the other hand, the inner and outer piping sections have walls of different thickness although approximately the same torsion-resistance moment.

The torsional spring in another embodiment of the invention consists of at least two concentric and helically coiled layers of fiber. It has been proven of great advantage in this embodiment of the torsional spring in accordance with the invention for each layer of fibers to consist of several preliminarily fiber-loaded screw-thread-like sector strips, each with an inner and an outer portion that connect them by way of the turnback and augment each other into cylinders that constitute the inner and outer piping section of a fiber layer.

The width of the inner and outer portions of each sector strip should remain constant over its total length, although the outer portions of the thread-like sector strips can be wider as well as thinner than the inner portions. The reinforcing strips in the thread-like sector strips should preferably parallel one another and the outer edges of the particular inner and outer portions.

It has been proven especially practical in torsional springs that consist of at least two concentric helically coiled layers of fiber for alternating concentric layers of fibers to coil in opposite directions and/or to different degrees of tightness. This design leads to an advantageous relationship between the adjacent layers of fiber in the event of stress, and the difference in coiling tightness allows the manufacture of torsional springs with a preferred stress direction.

In special cases it can also be of advantage for the inner and outer portion of the sector strips to be coiled at different angles when the inner and outer piping sections are constructed.

In addition to a continuous transition from an inner piping section to an outer piping section in the vicinity of the aforesaid turnback, it is also of advantage for only one short segment at each end of the torsional spring remote from the turnback to be provided with means of securing the torsional spring non-rotating to components that rotate in relation to each other.

Another embodiment of the invention is accordingly characterized in that the ends of the fiber-reinforced plastic piping sections that face away from the turnback have metal flanges cemented on for securing them to components that rotate in relation to each other and in that the flanges and piping sections overlap each other axially and have areas that contact each other over at least part of their circumferences.

The axial extent of the contact surfaces can be kept small while still providing area for enough cement to resist torque when the spring is used as intended.

The contact surfaces on the flanges can consist of grooves that extend all the way around them, and the ends of the piping sections can have sharp elevations that fit into the grooves. When the inner and outer piping sections consist of several concentric layers of fibers, there can be as many concentric grooves as there are layers, and the edge of every layer can be sharpened to fit into a groove, into which it is cemented tight.

The area available to the cement can be expanded even more by axially contouring the contact surfaces of the flanges and of the accordingly cemented ends to match along their circumferences. In addition to extending the area available to the cement, such contouring of the contact surfaces on the flanges and on the piping sections has at least to some extent a mechanically interlocking effect.

BRIEF DESCRIPTION OF THE DRAWINGS

Embodiments of the invention will now be specified with reference to the schematic drawings, wherein FIG. 3 is a larger-scale partial section through a torsional spring similar to that illustrated in FIGS. 1 and 2 and with inner and outer piping sections consisting of several concentric layers of fibers connected by a turnback, FIG. 4 is a view similar to that in FIG. 3 illustrating how such a layer of fibers can be constructed of screw-thread-like sector strips that augment one another into cylinders and create an inner and an outer piping section.

FIG. 5 illustrates a sector strip with an inner portion and an outer portion that connect by way of a turnback, FIG. 6 a view, sectional at the top, showing how a piping section on a torsional spring is connected to a metal flange, and FIG. 7 is a larger-scale detail of the area VII in FIG. 6 showing the contact surfaces of the flange and of the piping section prior to assembly.

DESCRIPTION OF THE PREFERRED EMBODIMENT

Figure 1:
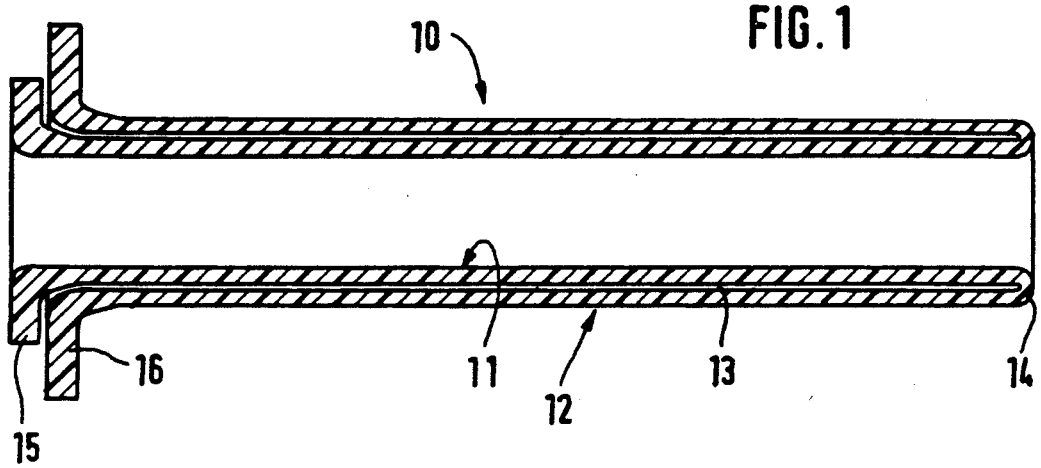
FIG. 1 is a longitudinal section through a torsional spring comprising an inner section loosely accommodated in a concentric outer section.

The embodiment illustrated in FIG. 1 is a torsional spring 10 made of glass-fiber reinforced plastic with an inner section 11 of piping and a coaxial outer section 12 of piping separated by an annular interstice 13. The torsional spring is in one piece in that the inner section directly merges into the outer section at a turnback 14 that connects them together non-rotating. The result is a series of piping sections constituting the torsional spring and with an overall spring constant that is lower than that of the two separate sections. The free ends of the piping sections, the ends remote from turnback 14, have radially extending and axially adjacent but separated mounting flanges 15 and 16. The flange 16 on outer section 12 is adjacent to the surface of the flange 15 that faces turnback 14 and extends radially beyond it.

Figure 2:
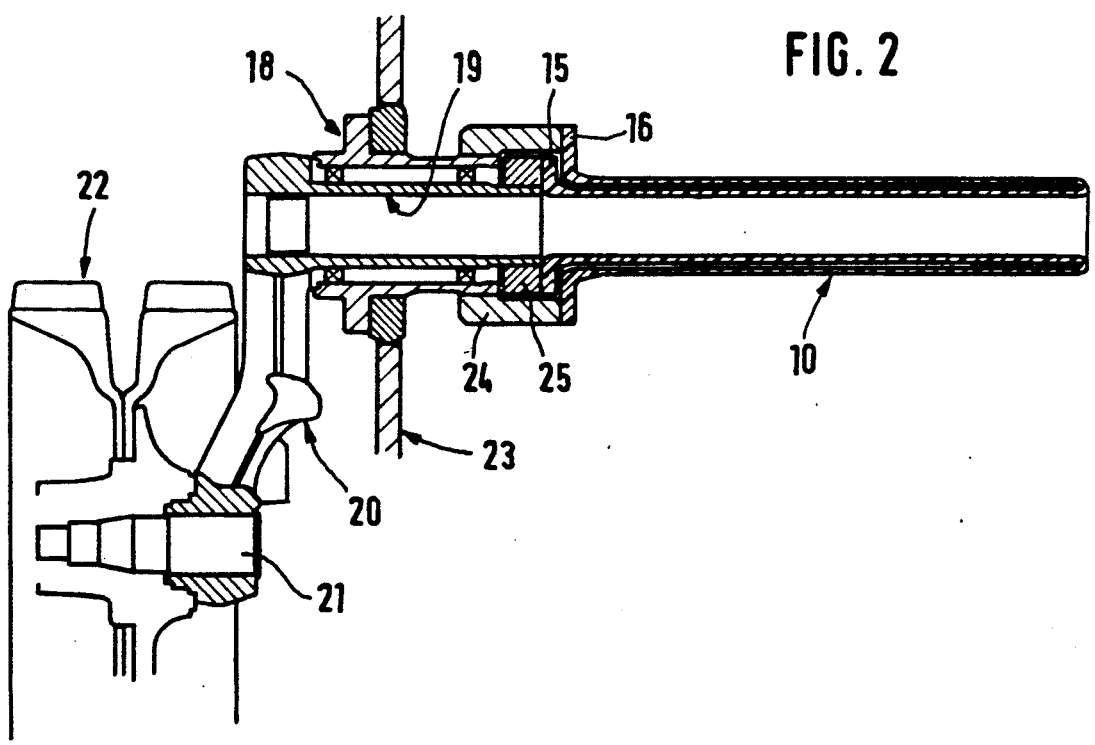
FIG. 2 illustrates how the torsional spring illustrated in FIG. 1 can be employed as a torsion bar for a Caterpillar cogwheel on the free end of a connecting rod that pivots in a bearing secured stationary to a vehicle with a bearing journal.

In the embodiment illustrated in FIG. 2, a pivoting arm 20 is mounted on a journal 19 that rotates in a bearing 18 secured stationary to a vehicle. The arm positions in a manner that is of no further interest in the present case a Caterpillar cogwheel 22 that rotates on another bearing journal 21. Bearing 18 is secured stationary in a manner that is illustrated only schematically in the drawing to the floor cavity 23 of an otherwise unillustrated Caterpillar vehicle. Secured non-rotating to the side of bearing 18 remote from pivoting arm 20 is a bearing ring 24 that extends axially beyond the actual bearing and that the flange 16 on the outer section 12 of torsional spring 10 is secured non-rotating to. Bearing journal 19 extends through bearing 18, and secured non-rotating to the side of the journal that faces away from pivoting arm 20 is a supporting ring 25 that is accommodated inside the section of bearing ring 24 extending beyond the bearing. The supporting ring secures the flange 15 on inner section 11 to torsional spring 10 non-rotating.

The inner and outer piping sections 11' and 12' of the torsional spring 10' illustrated in FIG. 3 each consist of four concentric layers of fibers securely cemented together. The portions of each layer associated with either an inner or an outer section merge uninterrupted at each turnback section and the turnback sections of the four layers of fibers constitute a turnback 14' that provides a continuous transition from the inner to the outer section of piping.

FIG. 4 illustrates the structure of a layer 30 of fibers consisting of several helically associated sector strips 31 that augment each other in creating two coaxial cylinders 32 and 33 connected through a turnback section. One such sector strip is illustrated in FIG. 5. These are prefabricated components made of inner and outer portions 36 and 37 of varying but constant width. Fiber inserts that parallel one another and the particular outer edge extend within the inner and outer portion of sector strip 31 and continuously through turnback section 35.

Characteristic of this sector strip is that both inner portion 36 and outer portion 37 extend like the thread on a screw, although in opposite directions at turnback section 35, so that the thread on outer portion 37 extends opposite that on inner portion 36.

The inner portion of the sector strip 31 in the embodiment illustrated in FIG. 4 is just as thick as its outer portion. When a torsional spring is built up out of several layers of fibers as illustrated in FIG. 3, the wall of the inner section of piping will be just as thick as that of the outer section and the slope of the thread-like inner and outer portions 36 and 37 of sector strips 31 must accordingly differ, as will be evident from the different diameters.

The outer portions 37 of the sector strips 31 that constitute the individual layers of fibers in the embodiment illustrated in FIG. 3 are not as thick as those of the inner portions 36 that constitute inner section 11'. It is practical for the outer portions 37 of the sector strips 31 that constitute the individual layers of fibers to be wider enough than the inner portions 36 to ensure that the inner and outer cylinders will be coiled at the same angle. In an embodiment of this type it is also easy to dimension the thickness of inner and outer portions 36 and 37 to ensure that the piping sections 11' and 12' of a torsional spring 10' consisting of several layers will have the same torsion-resistance moment.

It is practical for the adjacent layers of fibers of inner and outer piping sections 11' and 12' to coil in opposite directions.

FIG. 6 illustrates how the end of the inner section 11' of the torsional spring 10' remote from the turnback 14 in the embodiment illustrated in FIG. 3 is secured to a metal flange 15'. The outer section of piping and its associated flange are not illustrated. The contact surface of the flange has a number of concentric V-shaped grooves 40 that equals the number of layers of fibers and is engaged by the sharpened edges 41. The edges are also cemented into the grooves. The shape of the edges and grooves will be especially evident from FIG. 7.

The just-described design of the contact surfaces allows axial overlap and hence expansion of the cemented areas. Grooves 40 and the sharpened edges 41 at the end of the layers of fibers remote from the turnback are also provided with matching undulating contours 42, which not only expand the cemented areas even more but also ensure a mechanically interlocking connection between the flange and the piping section.

The embodiments illustrated in the drawing, and especially the embodiment in FIG. 2, demonstrate that a torsional spring comprising two coaxial piping sections secured at a turnback can be considerably shorter than known torsional springs. The inner and outer piping sections and the turnback that provides a continuous transition between them are exploited as effective resilient sections. The moments of torque are introduced into the torsional spring directly in the vicinity of the resilient tension. The result is a short and readily manufactured torsional spring that is easy to install and provides a long spring range in proportion to its overall length.

We claim:

1. A torsional spring comprising: at least two thin-walled tubular sections positioned coaxially and loosely separated radially along a common longitudinal axis of said tubular sections; said tubular sections being secured together at a first non-rotating end, said tubular sections comprising resilient sections; means for securing a second non-rotating end of said tubular sections to mutually rotating members at said second end and comprising a torsion bar for a connecting rod pivoting in a bearing mounted stationary in a vehicle to position wheel means at an end remote from said bearing; said tubular sections being integral with one another at said first end and one tubular section merging directly into another tubular section to form a curved integrally continuous portion at said first end, said portion being a transition point at which one tubular section reverses direction and becomes the other coaxial tubular section, said tubular sections comprising a one-piece unit.

2. A torsional spring comprising: at least two thin-walled tubular sections positioned coaxially and loosely separated radially along a common longitudinal axis of said tubular sections; said tubular sections being secured together at a first non-rotating end, said tubular sections comprising resilient sections; means for securing a second non-rotating end of said tubular sections to mutually rotating members at said second end and comprising a torsion bar for a connecting rod pivoting in a bearing mounted stationary in a vehicle to position wheel means at an end remote from said bearing; said tubular sections being integral with one another at said first end and one tubular section merging directly into another tubular section to form a curved integrally continuous portion at said first end, said portion being a transition point at which one tubular section reverses direction and becomes the other coaxial tubular section, said tubular sections comprising a one-piece unit; said tubular sections comprising fiber-reinforced plastic.

3. A torsional spring as defined in claim 2, wherein said tubular sections comprise fibers extending at 45° to said longitudinal axis of said tubular sections.

4. A torsional spring as defined in claim 2, wherein said fibers extend through said curved integrally continuous portion at said first end.

5. A torsional spring as defined in claim 4, wherein said fibers coil through each tubular section, said fibers following a helical path with mathematical sign representing a direction of said helical path, said mathematical sign reversing in vicinity of said transition point.

6. A torsional spring as defined in claim 2, wherein said tubular sections have walls of different thickness, said tubular sections having substantially the same torsion-resistance moment.

7. A torsional spring as defined in claim 2, wherein said tubular sections comprise at least two concentric and helically coiled layers of fibers.

8. A torsional spring as defined in claim 7, wherein each of said layers of fibers comprises a plurality of preloaded screw-thread-shaped section strips, each of said strips having an inner portion and an outer portion connected by said transition point and forming cylinders that comprise said tubular sections.

9. A torsional spring as defined in claim 8, wherein said inner portion and said outer portion have each a total length and a width that is constant over the total length.

10. A torsional spring as defined in claim 9, wherein the width of said outer portion is wider than the width of said inner portion.

11. A torsional spring as defined in claim 9, wherein said thread-shaped sector strips have reinforcing strips that are parallel to one another and to outer edges of said inner and outer portions.

12. A torsional spring as defined in claim 8, wherein said layers of fibers comprise alternating concentric layers coiling in opposite directions.

13. A torsional spring as defined in claim 12, wherein said alternating concentric layers of fibers coil to different degrees of tightness.

14. A torsional spring as defined in claim 8, wherein said inner portions and said outer portions of said sector strips are coiled at different angles when said tubular sections are constructed.

15. A torsional spring as defined in claim 2, including metal flanges cemented on said tubular sections at said second end for securing said tubular flanges to said rotating members, said rotating members rotating in relation to each other, said flanges and tubular sections overlapping each other axially and having areas with circumferences contacting each other over at least part of the circumferences.

16. A torsional spring as defined in claim 15, wherein the areas of contact on said flanges comprise grooves extending entirely around said flanges, said tubular sections having ends with sharp elevations fitting into said grooves.

17. A torsional spring as defined in claim 15, wherein said areas of contact of said flanges and of said cemented ends of said tubular sections are contoured to match along circumferences of said flanges and said tubular sections.

* * * * *